(12) United States Patent
Jiang et al.

(10) Patent No.: US 12,086,685 B2
(45) Date of Patent: Sep. 10, 2024

(54) MAJORANA LOOP STABILIZER CODES FOR ERROR CORRECTION OF FERMIONIC QUANTUM SIMULATIONS

(71) Applicant: Google LLC, Mountain View, CA (US)

(72) Inventors: Zhang Jiang, El Segundo, CA (US); Ryan Babbush, Venice, CA (US); Jarrod Ryan McClean, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 17/296,160

(22) PCT Filed: Dec. 17, 2019

(86) PCT No.: PCT/US2019/066732
§ 371 (c)(1),
(2) Date: May 21, 2021

(87) PCT Pub. No.: WO2020/131798
PCT Pub. Date: Jun. 25, 2020

(65) Prior Publication Data
US 2022/0019928 A1    Jan. 20, 2022

Related U.S. Application Data

(60) Provisional application No. 62/780,725, filed on Dec. 17, 2018.

(51) Int. Cl.
*G06F 15/16* (2006.01)
*G06N 10/00* (2022.01)

(52) U.S. Cl.
CPC ............. *G06N 10/00* (2019.01); *G06F 15/16* (2013.01)

(58) Field of Classification Search
CPC .......... G06F 15/76; G06F 15/80; G06F 30/20; G06F 17/16; G06F 15/82; G06F 16/9024;
(Continued)

(56) References Cited

U.S. PATENT DOCUMENTS 9,514,415 B2 * 12/2016 Bocharov .............. B82Y 10/00
2005/0224784 A1 * 10/2005 Amin ..................... G06N 10/00
257/14
(Continued)

OTHER PUBLICATIONS

Aharonov et al., "Fault-tolerant quantum computation with constant error rate," SIAM Journal on Computing, Jul. 2008, 63 pages.
(Continued)

*Primary Examiner* — Binh C Tat
(74) *Attorney, Agent, or Firm* — Fish & Richardson P.C.

(57) ABSTRACT

Methods, systems and apparatus for error correction of fermionic quantum simulation. In one aspect, a method includes representing a fermionic system as a graph of vertices and edges, where each vertex represents a fermionic system fermionic mode and each edge represents an interaction between two respective fermionic modes; allocating a qubit to each edge in the graph to form a qubit system; determining qubit operators that satisfy a set of fermionic commutation and dependence relations, where the qubit operators are non-uniform with respect to the graph vertices; determining stabilizer operators corresponding to products of quadratic Majorana operators on respective loops in the graph, where a common eigenspace of the defined stabilizer operators defines a code subspace that encodes states of the fermionic system to be simulated; and simulating the fermionic system by evolving the qubit system under a qubit Hamiltonian that includes the determined qubit operators and stabilizer operators.

25 Claims, 7 Drawing Sheets

(58) Field of Classification Search
CPC .. G06F 17/11; G06F 2111/10; G06F 2115/10; G06F 30/392; G06F 40/111; G06F 9/45504; G06F 11/0736; G06F 11/0751; G06F 11/0793; G06F 16/137; G06F 17/10; G06F 18/2415; G06F 18/295; G06F 2111/02; G06F 2111/08; G06F 30/25; G06F 30/32; G06F 30/3308; G06F 17/13; G06F 17/18; G06F 21/76; G06F 2119/10; G06F 30/15; G06F 30/23; G06F 9/02; G06F 9/32; G06F 12/0842; G06F 15/16; G06F 16/9014; G06F 16/9027; G06F 16/9038; G06F 17/175; G06F 18/2135; G06F 18/2136; G06F 18/2323; G06F 18/28; G06F 30/27; G06F 8/4434; G06F 9/30098; G06F 9/30101; G06F 9/30145; G06F 9/382; G06F 9/3836; G06F 9/3861; G06F 9/3869; G06F 9/5016; G06F 9/5027; G06F 9/5066; G06F 9/542; G06F 16/2455; G06F 1/26; G06F 21/44; G06F 16/217; G06F 16/248; G06F 16/9035; G06F 16/906; G06F 21/6245; G06F 16/182; G06F 16/24537; G06F 16/24544; G06F 16/24552; G06F 16/2456; G06F 16/2462; G06F 16/2471; G06F 16/27; G06F 16/278; G06F 9/4881; G06F 9/5044; G06F 9/5055; G06F 17/14; G06F 18/214; G06F 8/36; G06F 11/104; G06F 16/2379; G06F 16/245; G06F 16/25; G06F 16/951; G06F 18/213; G06F 18/23; G06F 18/24155; G06F 9/451; G06F 9/4806; G06F 9/5083; G06F 9/54; H01L 29/0665; H01L 29/0673; H01L 29/127; H01L 29/1606; H01L 29/7781; H01L 29/78648; H01L 29/78684; H01L 29/78696; G06N 10/00; G06N 20/00; G06N 10/60; G06N 10/80; G06N 10/70; G06N 10/20

USPC .................................................. 716/100–108

See application file for complete search history.

(56) References Cited

U.S. PATENT DOCUMENTS

| | | | |
|---|---|---|---|
| 2007/0239366 A1 | 10/2007 | Hilton et al. | |
| 2009/0164435 A1 | 6/2009 | Routt | |
| 2016/0283857 A1 | 9/2016 | Babbush et al. | |
| 2018/0053112 A1* | 2/2018 | Bravyi | G06F 30/392 |

OTHER PUBLICATIONS

Aliferis et al., "Quantum accuracy threshold for concatenated distance-3 codes," arXiv, Apr. 2005, 58 pages.

Babbush et al., "Low-depth quantum simulation of materials," Physical Review X, Mar. 2018, 8(1):1-40.

Bacon et al., "Operator quantum error-correcting subsystems for self-correcting quantum memories," Physical Review A, Jan. 2006, 73(1):1-17.

Ball et al., "Fermions without fermion fields," Physical Review Letters, Oct. 2005, 95(17):1-5.

Barends et al., "Digitized adiabatic quantum computing with a superconducting circuit," Nature, Jun. 2016, 534(7606):222-226.

Barends et al., "Superconducting quantum circuits at the surface code threshold for fault tolerance," Nature, Apr. 2014, 508(7497):500-503.

Bonet-Monroig et al., "Low-cost error mitigation by symmetry verification," Physical Review A, Dec. 2018, 98(6):1-11.

Bookatz et al.,"Error suppression in Hamiltonian-based quantum computation using energy penalties," Physical Review A, Aug. 2015, 92(2):1-26.

Bravyi et al., "Fermionic quantum computation," Annals of Physics, May 2002, 298(1):1-18.

Bravyi et al., "Majorana Fermion Codes," New Journal of Physics, Aug. 2010, 12(8):1-23.

Calderbank et al., "Good quantum error-correcting codes exist," Physical Review A, Aug. 1996, 54(2):1-24.

Chen et al., "Exact bosonization in two spatial dimensions and a new class of lattice gauge theories," Annals of Physics, Jun. 2018, 393:1-31.

Cirac et al., "Quantum computations with cold trapped ions," Physical Review Letters, May 1995, 74(20):4091-4094.

Colless et al., "Computation of molecular spectra on a quantum processor with an error-resilient algorithm," Physical Review X, Feb. 2018, 8(1):1-7.

Devitt et al., "Requirements for fault-tolerant factoring on an atom-optics quantum computer," Nature Communications, Oct. 2013, 4(1):1-8.

Devoret et al., "Superconducting qubits: A short review," arXiv, Feb. 2008, 41 pages.

Feynman et al., "Simulating physics with computers," Feynman and Computation, Mar. 2018, 467-488.

Fowler et al., "Surface codes: Towards practical large-scale quantum computation," Physical Review A, Sep. 2012, 86(3):1-54.

Georgescu et al., "Quantum simulation," Reviews of Modern Physics, Mar. 2014, 86(1):1-41.

Gottesman et al., "Quantum fault tolerance in small experiments," arXiv, Oct. 2016, 8 pages.

Häffner et al., "Quantum computing with trapped ions," Physics Reports, Dec. 2008, 469(4):99 pages.

Harper et al., "Fault-tolerant logical gates in the IBM quantum experience," Physical Review Letters, Feb. 2019, 122(8):1-8.

Hastings et al., "Improving quantum algorithms for quantum chemistry," arXiv, Mar. 2014, 12 pages.

Havlíček et al., "Operator locality in the quantum simulation of fermionic models," Physical Review A, Mar. 2017, 95(3):1-10.

Houck et al., "On-chip quantum simulation with superconducting circuits," Nature Physics, Apr. 2012, 8(4):292-299.

Jiang et al., "Majorana loop stabilizer codes for error correction of fermionic quantum simulations," arXiv, Aug. 2020, 17 pages.

Jiang et al., "Non-commuting two-local Hamiltonians for quantum error suppression," Quantum Information Processing, Apr. 2017, 16(4):1-89.

Jiang et al., "Quantum algorithms to simulate many-body physics of correlated fermions," Physical Review Applied, Apr. 2018, 9(4):1-23.

Kielpinski et al., "Architecture for a large-scale ion-trap quantum computer," Nature, Jun. 2002, 417(6890):709-711.

Kitaev et al., "Quantum computations: algorithms and error correction," Uspekhi Matematicheskikh Nauk, 1997, 52(6):53-112.

Kivlichan et al., "Quantum simulation of electronic structure with linear depth and connectivity," Physical Review Letters, Mar. 2018, 120(11):1-8.

Levin et al., "Fermions, strings, and gauge fields in lattice spin models," Physical Review B, Jun. 2003, 67(24):1-11.

Li et al., "Efficient variational quantum simulator incorporating active error minimization," Physical Review X, Jun. 2017, 7(2):1-14.

Lloyd et al., "Universal quantum simulators," Science, Aug. 1996, 23:1073-1078.

McArdle et al., "Error-mitigated digital quantum simulation," Physical Review Letters, May 2019, 122(18):1-6.

McClean et al., "Decoding quantum errors with subspace expansions," Nature Communications, Jan. 2020, 11(1):1-9.

McClean et al., "Hybrid quantum-classical hierarchy for mitigation of decoherence and determination of excited states," Physical Review A., Apr. 2017, 95(4):1-10.

McClean et al., "The theory of variational hybrid quantum-classical algorithms," New Journal of Physics, Feb. 2016, 18(2):1-23.

Motta et al., "Low rank representations for quantum simulation of electronic structure," arXiv, May 2021, 7 pages.

(56) References Cited

OTHER PUBLICATIONS

O'Gorman et al., "Generalized swap networks for near-term quantum computing," arXiv, May 2019, 16 pages.
O'Gorman et al., "Quantum computation with realistic magic-state factories," Physical Review A, Mar. 2017, 95(3):1-19.
Ortiz et al., "Quantum algorithms for fermionic simulations," Physical Review A, Jul. 2001, 64(2):1-38.
PCT International Preliminary Report on Patentability in International Application No. PCT/US2019/066732, dated Jul. 1, 2021, 13 pages.
PCT International Search Report and Written Opinion in International Appln. No. PCT/US2019/066732, dated Apr. 24, 2020, 19 pages.
Preskill et al., "Quantum Computing in the NISQ era and beyond," Quantum, Aug. 2018, 6:1-20.
Roffe et al., "Protecting quantum memories using coherent parity check codes," Quantum Science and Technology, Jun. 2018, 3(3):1-28.
Setia et al., "Superfast encodings for fermionic quantum simulation," Physical Review Research, Oct. 2019, 1(3):1-8.
Setia et al., "Superfast simulation of electronic structure on a quantum computer," The Journal of Chemical Physics, Apr. 2018, 148(16):1-13.
Shor et al., "Scheme for reducing decoherence in quantum computer memory," Physical Review A, Oct. 1995, 52(4):13.
Steane, "Error Correcting Codes in Quantum Theory," Physical Review Letters, Jul. 1996, 77(5):793-797.
Steudtner et al., "Quantum codes for quantum simulation of fermions on a square lattice of qubits," Physical Review A, Feb. 2019, 99(2):1-43.
Temme et al., "Error mitigation for short-depth quantum circuits," Physical Review Letters, Nov. 2017, 119(18):1-15.
Unruh et al., "Maintaining coherence in quantum computers," Physical Review A, Feb. 1995, 51(2):1-13.
Verstraete et al., "Mapping local Hamiltonians of fermions to local Hamiltonians of spins," Journal of Statistical Mechanics: Theory and Experiment, Sep. 2005, 2005(09):1-7.
Wallman et al., "Noise tailoring for scalable quantum computation via randomized compiling," Physical Review A, Nov. 2016, 94(5):1-10.
Wecker et al., "Solving strongly correlated electron models on a quantum computer," Physical Review A, Dec. 2015, 92(6):1-27.
Wen et al., "Quantum order from string-net condensations and the origin of light and massless fermions," Physical Review D, Sep. 2003, 68(6):1-24.
Wendin et al., "Quantum information processing with superconducting circuits: a review," Reports on Progress in Physics, Sep. 2017, 80(10):1-108.
Whitfield et al., "Local spin operators for fermion simulations," Physical Review A, Sep. 2016, 94(3):1-5.
Young et al., "Error suppression and error correction in adiabatic quantum computation: Techniques and challenges," Physical Review X, Nov. 2013, 15(12):1-13.
Office Action in Chinese Appln. No. 201980083716.3, mailed on Jan. 22, 2024, 37 pages (with English translation).
Sun, "Study on the Problem of Quantum State Transformation based on Majorana Quasiparticles" Journal of Zhejiang Sci-Tech University, vol. 33, No. 1, Jan. 2015, 5 pages (with English abstract).
Xu et al., "Simulating the exchange of Majorana zero modes with a photonic system" Nature Communications 7.1, Oct. 2016, 8 pages.
Office Action in Chinese Appln. No. 201980083716.3, mailed on Jul. 11, 2024, 27 pages (with English translation).

\* cited by examiner

MAJORANA LOOP STABILIZER CODES FOR ERROR CORRECTION OF FERMIONIC QUANTUM SIMULATIONS

This application is a National Stage Application under 35 U.S.C. § 371 and claims the benefit of International Application No. PCT/US2019/066732, filed Dec. 17, 2019, which claims priority to U.S. Application No. 62/780,725, filed Dec. 17, 2018, the disclosure of which is incorporated herein by reference.

BACKGROUND

This specification relates to quantum computing.

Applications of quantum computing include quantum simulation. The simulation of quantum systems, e.g., systems of electrons, has applications in a variety of different areas ranging from pharmaceutical synthesis to the design of novel catalysts and materials. However, simulating complex quantum systems using classical techniques can be untenable due to the exponential scaling of required resources as a function of system size N. Quantum computers and quantum simulation techniques can offer computationally feasible solutions to this task.

SUMMARY

This specification describes technologies for error detection and correction of fermionic quantum simulations. In particular, this specification describes technologies that are particularly suited for implementing error detection and correction of fermionic quantum simulations on near-term quantum computing hardware with only short-ranged interactions between qubits.

In general, one innovative aspect of the subject matter described in this specification can be implemented in a method for quantum simulation of a fermionic system, wherein the fermionic system is characterized by a fermionic Hamiltonian comprising elements from a group of quadratic Majorana operators of even weights, wherein the quadratic Majorana operators satisfy a set of commutation relations and a dependence relation that implies that the quadratic Majorana operators are not independent, the method including: representing the fermionic system as an interaction graph of vertices and edges, wherein each vertex represents a fermionic system fermionic mode and each edge represents an interaction between two respective fermionic modes; allocating a qubit to each edge in the interaction graph to form a qubit system; determining qubit operators that satisfy the set of commutation relations and the dependence relation, wherein the qubit operators are non-uniform with respect to the interaction graph vertices; determining stabilizer operators corresponding to products of quadratic Majorana operators on respective loops in the interaction graph, wherein a common eigenspace of the defined stabilizer operators defines a code subspace that encodes states of the fermionic system; and simulating the fermionic system by evolving the qubit system under a qubit Hamiltonian, wherein the qubit Hamiltonian comprises the determined qubit operators and the determined stabilizer operators.

Other implementations of this aspect include corresponding computer systems, apparatus, and computer programs recorded on one or more computer storage devices, each configured to perform the actions of the methods. A system of one or more classical and/or quantum computers can be configured to perform particular operations or actions by virtue of having hardware, software, firmware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the qubit operators comprise Pauli-Y operators.

In some implementations evolving the qubit system under the qubit Hamiltonian includes correcting all single qubit errors.

In some implementations the determined qubit operators have weight greater or equal to three. In some implementations the determined qubit operators have weight less than or equal to four.

In some implementations the fermionic system comprises a two-dimensional square lattice of fermions.

In some implementations the lattice comprises periodic boundary conditions. In some implementations the lattice comprises open boundary conditions.

In some implementations the qubit operators comprise edge and vertex operators, and wherein the method further comprises: adding a first number of dangling edges to the interaction graph, wherein the first number is equal to the number of boundary vertices in the interaction graph plus four; determining a respective boundary stabilizer operator for each dangling edge, comprising, for each dangling edge: determining a respective dangling edge operator, wherein the dangling edge operator anti-commutes with incident vertex and edge operators and commutes with the determined stabilizer operators; determining a product of edge operators in a respective boundary plaquette, wherein the product of edge operators in the respective boundary plaquette commute with the determined qubit operators and anti-commute with each neighboring product of edge operators in a neighboring boundary plaquette; determining a conjugate operator, wherein the conjugate operator anti-commutes with the dangling edge operator for the dangling edge, commutes with the determined qubit operators, commutes with dangling edge operators for other dangling edges, and commutes with other conjugate operators; defining the boundary stabilizer operator for the dangling edge as equal to i multiplied by the product of edge operators in the respective boundary plaquette multiplied by the conjugate operator for the dangling edge.

In some implementations the determined boundary stabilizer operators commute with the determined qubit operators, determined stabilizer operators, and with each other.

In some implementations the method further comprises allocating a qubit to each dangling edge.

In some implementations the method further comprises applying a transformation to the quadratic Majorana operators to generate transformed quadratic Majorana operators, comprising: representing each quadratic Majorana operator as a 2n dimensional vector over the Galois field of two elements; constructing a matrix whose rows correspond to the transformed quadratic Majorana operators; and generating a set of transformed quadratic Majorana operators by applying the constructed matrix to each of the quadratic Majorana operators.

In some implementations the transformed quadratic Majorana operators satisfy the set of commutation relations.

In some implementations the method further comprises modifying the determined qubit operators and updating the determined stabilizer operators based on the modified determined qubit operators, comprising repeatedly, until each qubit operator and stabilizer operator have been updated: identifying a Pauli operator that anti-commutes with at least one determined stabilizer operator; selecting a determined qubit operator and updating the selected qubit operator by multiplying the selected determined qubit operator by the identified Pauli operator; identifying a set of determined qubit operators, wherein the set of determined qubit operators excludes the determined qubit operator and anti-commutes with the identified Pauli operator; updating determined qubit operators in the identified set of determined qubit operators by multiplying each qubit operator by one of the at least one determined stabilizer operator; and updating the at least one determined stabilizer operators using the updated qubit operators.

In some implementations during the evolving of the qubit system the defined stabilizer operators restrict the state of the qubit system to the code subspace.

In some implementations the determined qubit operators comprise qubit operators corresponding to respective edges in the interaction graph, and wherein defining stabilizer operators corresponding to products of quadratic Majorana operators on respective loops in the interaction graph comprises defining stabilizer operators equal to products of the qubit edge operators on respective loops in the interaction graph.

In some implementations the defined stabilizer operators commute with each of the determined qubit operators and with each other.

In some implementations the qubit system preserves locality of the fermionic system.

In some implementations determining the qubit operators comprises: for each vertex in the interaction graph, selecting an order for all incident edges for the vertex; and using the selected orders to map the quadratic majorana operators to respective qubit operators.

In some implementations evolving the qubit system comprises: evolving the qubit system for a predetermined time under the qubit Hamiltonian to generate an evolved qubit system; and experimentally probing the evolved qubit system to determine properties of the fermionic system.

In some implementations the fermionic system is represented by the Hubbard model, and wherein evolving the qubit system using a quantum computing device to simulate the fermionic system comprises evolving the qubit system using a quantum computing device to simulate properties of the fermionic system.

In some implementations the fermionic system represents a material, and wherein properties of the fermionic system comprises superconductivity, magnetism, strength of interaction-driven metal-insulator transitions, optical conductivity, or behavior of spin correlations with doping.

In some implementations the material comprises a cuprate material.

In some implementations the fermionic system comprises a copper oxide superconductor, and wherein properties of the fermionic system comprises the presence of phase separation.

The subject matter described in this specification can be implemented in particular ways so as to realize one or more of the following advantages.

Fermion-to-qubit mappings that preserve geometric locality are especially useful for simulating lattice fermion models, e.g., the Hubbard model, on a quantum computer. They avoid the overhead associated with geometric non-local parity terms in mappings such as the Jordan-Wigner transformation and the Bravyi-Kitaev transformation. As a result, they often provide quantum circuits with lower depth and gate complexity. In such encodings, fermionic states are encoded in the common +1 eigenspace of a set of stabilizers, akin to stabilizer quantum error-correcting codes.

The present described techniques introduce a geometric locality-preserving Majorana loop stabilizer code whose stabilizers correspond to products of Majorana operators on closed paths of the fermionic hopping graph. The Majorana loop stabilizer code can correct all single-qubit errors on a 2-dimensional square lattice—while previous geometric locality-preserving codes can only detect single-qubit errors on the same lattice. Compared to existing codes, the Majorana loop stabilizer code maps the relevant fermionic operators to lower-weight qubit operators despite having higher code distance.

The Majorana loop stabilizer code can also be applied to models other than lattice models. For example, Majorana loop stabilizer code is compatible with state-of-the-art algorithms for simulating quantum chemistry, and can offer those simulations the same error-correction properties without additional asymptotic overhead.

The above described properties make the Majorana loop stabilizer code particularly suited to error-mitigated quantum simulations of fermions on near-term devices, which often have a limited number of qubits arranged in a lattice and/or are limited to short ranged, e.g. nearest neighbor, interactions between qubits. However, the Majorana loop stabilizer code can equally be used for error-mitigated quantum simulations of fermions on devices that include larger numbers of qubits with short range and/or longer range interactions.

In addition, the presently described Majorana loop stabilizer code can be applied to a wide range of technical applications, including efficient design or testing of materials, predicting the rates of certain chemical reactions or efficient synthetization of pharmaceuticals.

The details of one or more implementations of the subject matter of this specification are set forth in the description and appendix. Other features, aspects, and advantages of the subject matter will become apparent from the description, the appendix, and the claims.

BRIEF DESCRIPTION OF THE DRAWINGS

Like reference numbers and designations in the various drawings indicate like elements.

DETAILED DESCRIPTION

Overview

Figure 1:
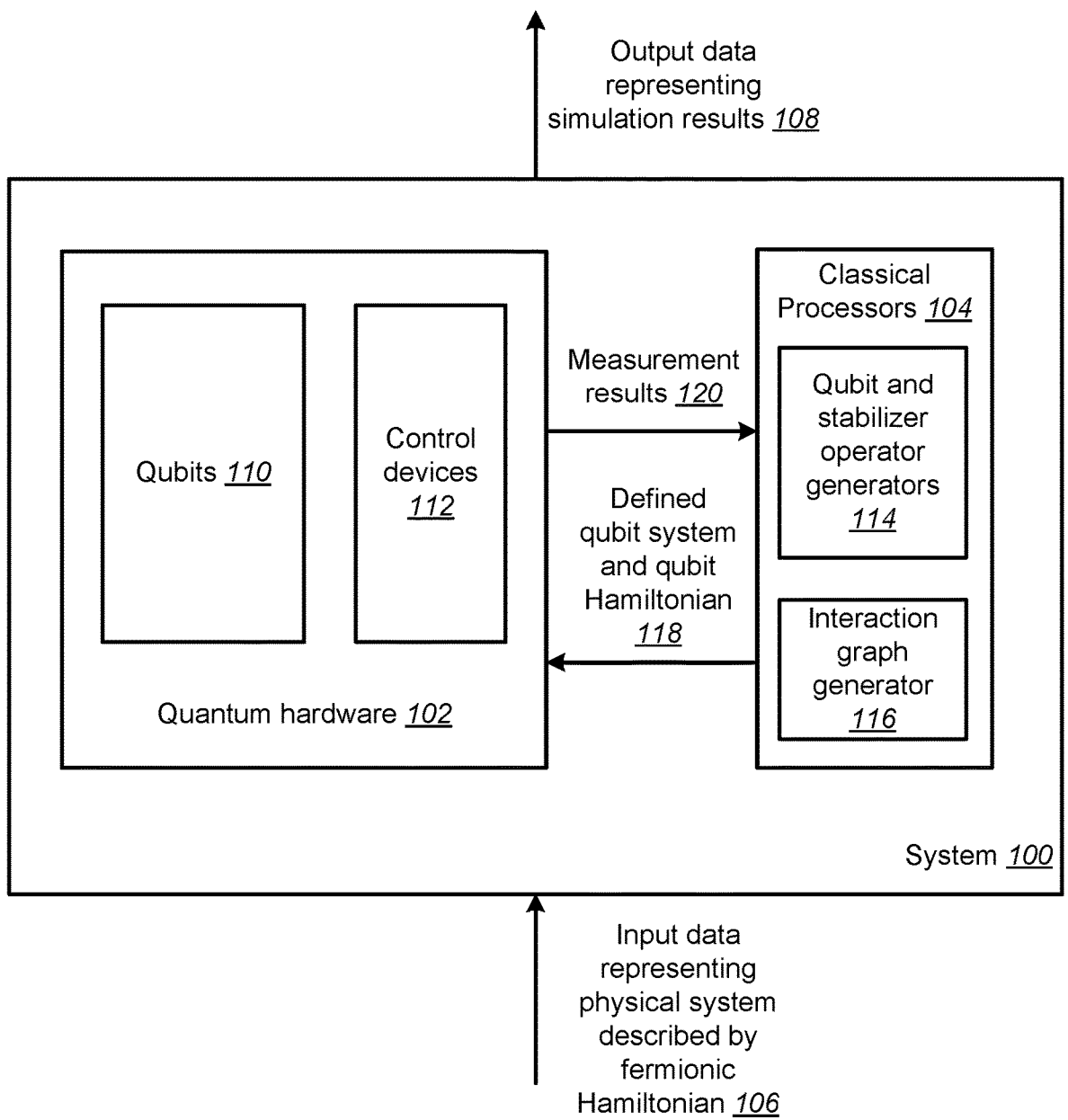
FIG. 1 is an diagram of an example system for implementing error corrected quantum simulations of fermionic systems

Fermionic systems must be mapped to qubit systems before they can be simulated on a quantum computer.

Existing techniques for performing such mappings include the Jordan-Wigner transformation or the Bravyi-Kitaev transformation. Both techniques suffer drawbacks—the Jordan-Wigner transformation introduces non-local parity terms that act on a large number of qubits. These parity terms add considerable overhead to quantum simulations of local fermionic systems. The Bravyi-Kitaev transformation reduces these overheads, however, the resulting qubit operators of the BK transformation are still geometrically non-local. This problem becomes prominent on near-term quantum devices where only short-range qubit-qubit interactions are available. To implement a simulation of the fermionic system on such near-term quantum devices, a mapping of the fermionic system to a qubit system with short-ranged (e.g. nearest neighbor) interactions is desirable.

The Bravyi-Kitaev superfast (BKSF) transformation is an example fermion-to-qubit mapping that preserves geometric locality. However, a no-go theorem shows that the BKSF transformation cannot correct all single qubit errors without including additional vertices and edges in an interaction graph representing the fermionic system (i.e., without increasing the complexity of the simulation) if the vertex degree of the interaction graph is larger than or equal to 6. The BKSF can only detect single qubit errors.

This specification describes a geometric locality preserving fermion-qubit map that can correct all single-qubit errors on graphs with vertex degree equal to 4—without introducing any additional vertices or edges. As with the BKSF, the logical (qubit) operators in the presently described code satisfy the standard commutation relations of the corresponding Majorana operators. The stabilizers of the code are defined as products of Majorana operators on a loop. The code is therefore described herein as a Majorana loop stabilizer code (MLSC). Fermionic operators corresponding to edges in the interaction graph representation of the fermionic system can be non-uniform and/or include Pauli-Y operators, which allows the mapping to evade the no-go theorem. For example, by using logical operators that are non-uniform or include Pauli-Y operators, the weights of logical operators can be balanced. Since the smallest weight of a logical operator defines the code distance, balancing the weights of the logical operators can increase the code distance while reducing simulation complexity.

Majorana Operators

The fermionic system to be simulated is characterized by a fermionic Hamiltonian. The fermionic Hamiltonian may be expressed in terms of single-mode Majorana operators. Single-mode Majorana operators can be defined as linear combinations of fermionic creation and annihilation operators $$f_{2k} = c_k^\dagger + c_k, \quad f_{2k+1} = i(c_k^\dagger - c_k) \tag{1}$$

where $c_k^\dagger$, $c_k$ represent the fermionic creation and annihilation operators, respectively. The fermionic ladder operators satisfy the relations $$f_k^\dagger = f_k, \quad \{f_j, f_k\} = 2\delta_{j,k} \tag{2}$$

where $\{\bullet, \bullet\}$ represents an anti-commutator and $S$ is the Kronecker delta function.

The single-mode Majorana operators $f_0, f_1, \ldots, f_{2n-1}$, together with a phase factor $i$, generate a group $\mathcal{M}_{2n}$ where an arbitrary element in the group $\mathcal{M}_{2n}$ takes the form $$\phi f_A, f_A = \Pi_{k \in A} f_k \tag{3}$$

where $\phi \in \{\pm 1, \pm i\}$ is an overall phase factor. The set $A \subseteq \{0, 1, \ldots, 2n-1\}$ is the support of the Majorana operator. The order of the operators in the product $f_A$ matters, and the convention that the index $k$ increases monotonically from left to right is followed. The weight of a Majorana operator equals the number of fermionic modes that it acts non-trivially on, i.e., the weight of $f_A$ is $|A|$. Two Majorana operators $f_A$ and $f_B$ either commute or anti-commute $$f_A f_B = (-1)^{|A| \cdot |B| + |A \cdot B|} f_B f_A \tag{4}$$

The commutation relationship is determined by the parity of the overlap $|A \cap B|$ when either $|A|$ or $|B|$ is even.

In terms of Majorana operators, the fermionic occupation operator reads $$c_k^\dagger c_k = \tfrac{1}{2}(\mathbb{I} + i f_{2k} f_{2k+1}) \tag{5}$$

where $\mathbb{I}$ represents the identity operator. The fermionic hopping operator term takes the form $$c_j^\dagger c_k + h.c = \frac{i}{2}(f_{2j} f_{2k+1} - f_{2j+1} f_{2k}). \tag{6}$$

The Majorana operators include Majorana operators corresponding to respective vertices in an interaction graph representation of the fermionic system and Majorana operators corresponding to respective edges in the interaction graph. For convenience, in this specification fermions can hop between neighboring vertices of an undirected graph $G(V,E)$ with vertices $V$ and edges $E$. For the set of quadratic Majorana operators $$\eta_k = i f_{2k} f_{2k+1} \text{ for each vertex } k \in V \tag{7a}$$

$$\xi_{jk} = i f_{2j} f_{2k} \text{ for each edge } (j,k) \in E \tag{7b}$$

the occupation term in Equation (5) and the hopping term in Equation (6) can be expressed as $$c_k^\dagger c_k = \frac{1}{2}(\mathbb{I} + \eta_k) \tag{8a}$$

$$c_j^\dagger c_k + h.c = -\frac{i}{2}(\xi_{jk} \eta_k + \eta_j \xi_{jk}). \tag{8b}$$

The operators in Equations (7a, 7b) generate a group $\mathcal{M}_{2n}^{even}$ that consists of Majorana operators of even weights. Any physical fermionic Hamiltonian can be written as a sum of elements in the group $\mathcal{M}_{2n}^{even}$.

The quadratic Majorana generators in Equations (7a, 7b) are both Hermitian and unitary. The satisfy commutation relations $$\eta_j \eta_k = \eta_k \eta_j \tag{9a}$$

$$\eta_j \xi_{jk} = (-1)^{\delta_{jl} + \delta_{kl}} \xi_{jk} \eta_l, \tag{9b}$$

$$\xi_{lm} \xi_{jk} = (-1)^{\delta_{jl} + \delta_{kl} + \delta_{jm} + \delta_{km}} \xi_{jk} \xi_{lm}. \tag{9c}$$

In addition to Equations (9a-c) the following condition on any closed path in the graph G closes the algebra $$(-i)^l \xi_{k_0 k_1} \xi_{k_1 k_2} \cdots \xi_{k_{l-1} k_0} = \mathbb{I}, \tag{10}$$

where $l$ represents the length of the path. This relation implies that the generators in Equations (9a-c) are not independent. The total number of independent closed paths is $N_E - N_V + 1$ where $N_V$ ($N_E$) represents the total number of vertices (edges) of the graph G. As described below with reference to FIG. 2, the condition in Equation (10) is not automatically satisfied when fermion operators are mapped to qubit operators.

Example Hardware

FIG. 1 depicts an example system 100 for implementing error corrected quantum simulations of fermionic systems. The example system 100 is an example of a system implemented as classical or quantum computer programs on one or more classical computers or quantum computing devices in one or more locations, in which the systems, components, and techniques described below can be implemented.

The system 100 includes quantum hardware 102 in data communication with a classical processor 104. For convenience, the classical processor 104 and quantum computing hardware 102 are illustrated as separate entities, however in some implementations the classical processor 104 can be included in quantum computing hardware 102, e.g., the quantum computing hardware 102 can include one or more components for performing classical computing operations.

The system 100 may receive as input data that may include data representing a physical system of interest, e.g., input data 106. The received data representing a physical system of interest may include data representing a physical system that is to be modeled or simulated. The physical system can be a fermionic system characterized by a fermionic Hamiltonian, as described above with reference to Equations (1)-(10). The physical system may be a periodic or non-periodic system.

The system may generate as output data representing results of simulating the physical system of interest, e.g., output data 108, and may include data that may be used to determine properties of the physical system. For example, in some implementations the physical system may be a material e.g., a semiconductor. In these cases data representing simulation results may be used to determined properties of the material, e.g., conductivity, magnetism, strength of interaction-driven metal-insulator transitions, optical conductivity, or behavior of spin correlations with doping.

The system 100 is configured to perform classical computations in combination with quantum computations using the classical processors 104 and quantum hardware 102.

The quantum hardware 102 includes multiple physical qubits 110 that are used to perform algorithmic operations or quantum computations. The specific realization of the qubits that the quantum computing hardware 102 includes and how they interact with one another is dependent on a variety of factors including the type of quantum computations that the quantum computing hardware is performing. For example, the qubits may include qubits that are physically realized via atomic, molecular or solid-state quantum systems. In other examples the qubits may include, but are not limited to, superconducting qubits or semi-conducting qubits. Near-term quantum computing devices are often limited to planar geometries (e.g. finite 2D lattices) of qubits that, with only short ranged (e.g. nearest neighbor) interactions between qubits.

In some implementations the qubits 110 can be frequency tunable. For example, each qubit may have associated operating frequencies that can be adjusted, e.g., using one or more control devices 112, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates, e.g., Pauli X, Y and Z gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The control devices 112 can further include measurement devices, e.g., readout resonators. Measurement results (measurement data) obtained via measurement devices may be provided to classical processors included in the quantum computing hardware 102 or to the classical processor 104 for processing and analyzing.

The classical processors 104 can include various components for performing the classical operations described in this specification. For example, the classical processors 104 include an interaction graph generator 116 that is configured to represent a fermionic system specified by the input data 106 as an interaction graph of vertices and edges, where each vertex represents a fermionic system fermionic mode and each edge represents an interaction between two respective fermionic modes. The interaction graph generator 116 is further configured to allocate a qubit to each edge in a generated interaction graph to form a qubit system, and provide data representing the qubit system to the quantum computing hardware 102. Additional operations performed by the interaction graph generator 116 are described below with reference to FIG. 2.

The classical processors 104 further include a qubit and stabilizer operator generator 114. The qubit and stabilizer operator generator 114 is configured to determine qubit operators for the qubit system defined by the interaction graph generator 116 that satisfy fermionic commutation relations and a dependence relation. The qubit operators generated by the qubit and stabilizer operator generator 114 can be non-uniform with respect to the interaction graph vertices. The qubit and stabilizer operator generator 114 is configured to determine stabilizer operators corresponding to products of quadratic Majorana operators on respective loops in the interaction graph, wherein a common eigenspace of the defined stabilizer operators defines a code subspace that encodes states of the fermionic system. Additional operations performed by the qubit and stabilizer operator generator 114 are described below with reference to FIG. 2.

The classical processors 104 can provide data 118 representing the generated interaction graph/qubit system and determined qubit and stabilizer operators to the quantum computing hardware 102. The quantum computing hardware 102 can then perform a quantum simulation of the fermionic system specified by the input data 106 by evolving a physical qubit system specified by the data 118 under a qubit Hamiltonian specified by the data 118, e.g., a qubit Hamiltonian that corresponds to the fermionic Hamiltonian and includes determined qubit operators and the determined stabilizer operators. Additional operations that the classical processors 104 and quantum computing hardware 102 are configured to perform include the operations described below with reference to FIGS. 2-5.

Operating the Hardware: Example Implementation of MLSC

Figure 2:
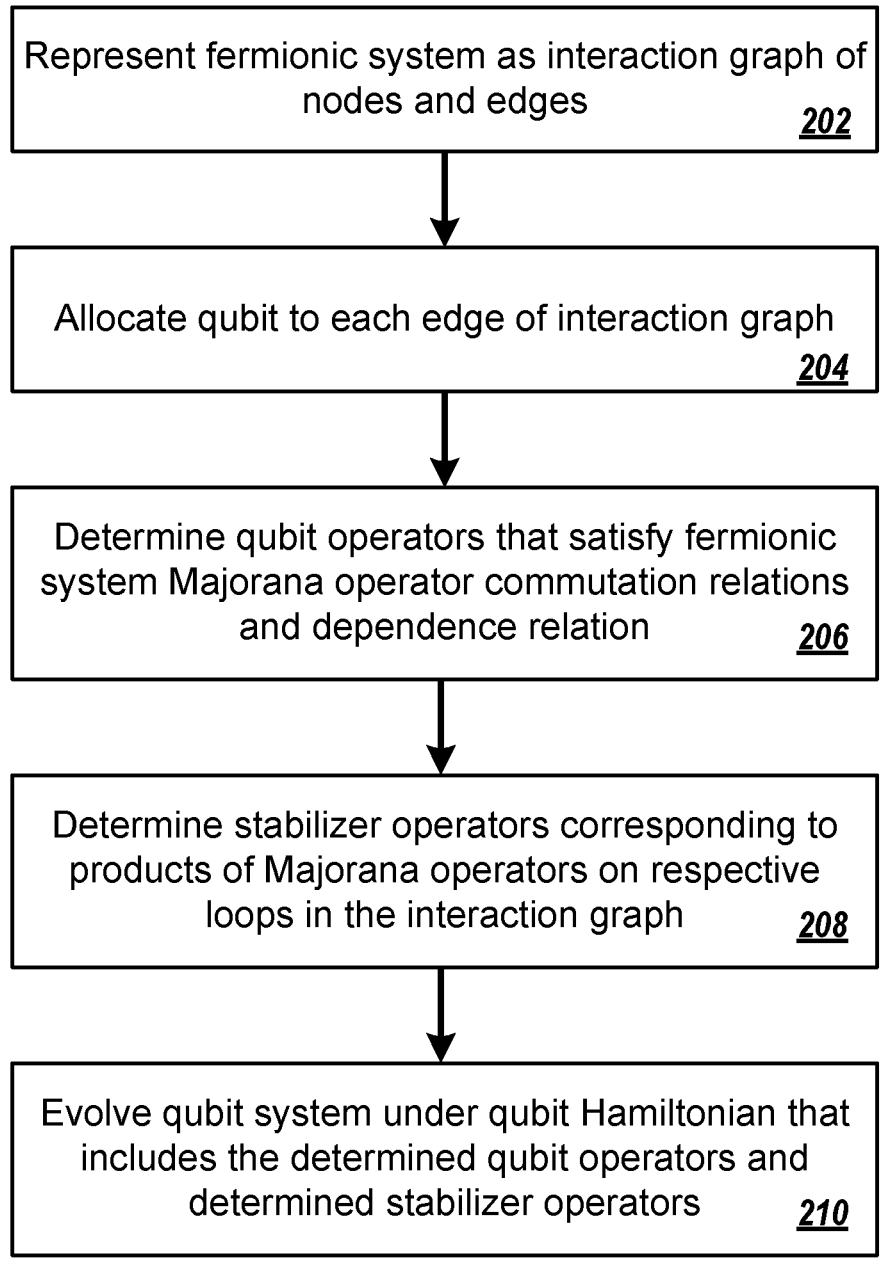
FIG. 2 is a flow diagram of an example process for Majorana loop stabilizer code error correction of a quantum simulation of a fermionic system.

FIG. 2 is a flow diagram of an example process 200 for Majorana loop stabilizer code (MLSC) error correction of a quantum simulation of a fermionic system. In example process 200, the fermionic system is characterized by a fermionic Hamiltonian including elements from a group of quadratic Majorana operators of even weights, where the quadratic Majorana operators satisfy a set of commutation relations and a dependence relation that implies that the quadratic Majorana operators are not independent. For convenience, the process 200 will be described as being performed by a quantum computing system. For example, the system 100 of FIG. 1, appropriately programmed in accordance with this specification, can perform the process 200.

The system maps the fermionic system to a corresponding locality-preserving qubit system. To map the fermionic system to a corresponding locality-preserving qubit system, the system represents the fermionic system as an interaction graph of vertices and edges (step 202). Each vertex in the interaction graph represents a fermionic system fermionic mode. Each edge in the interaction graph represents an interaction between two respective fermionic modes. The number of vertices and edges is dependent on the specific form of the fermionic system, e.g., the form of the Hamiltonian characterizing the fermionic system. In some implementations the vertex degree of the interaction graph may be equal to 4. The system then allocates a qubit to each edge in the interaction graph to form a qubit system that preserves the locality of the fermionic system (step 204).

Figure 3:
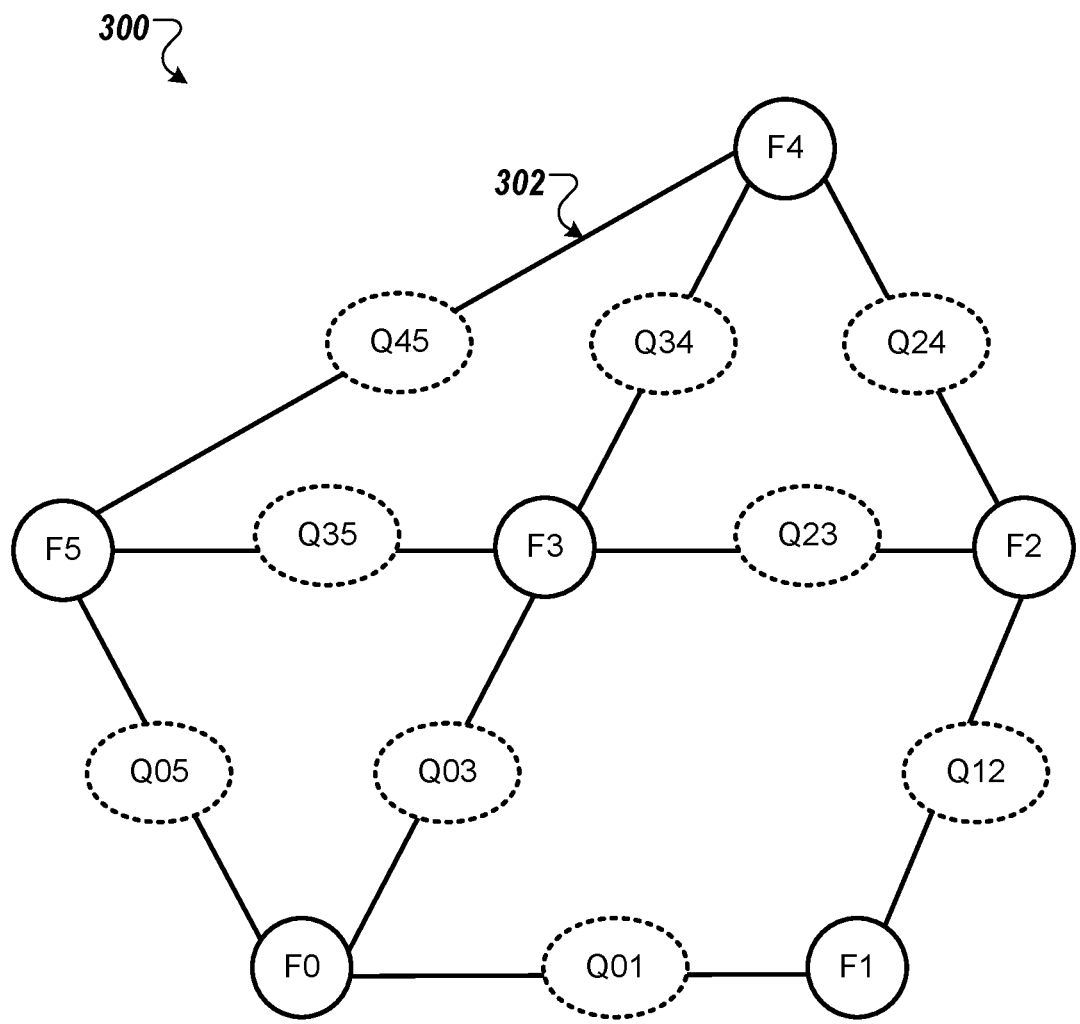
FIG. 3 shows an example interaction graph representing a fermionic system.

An example interaction graph 300 representing a fermionic system is shown in FIG. 3. In the example interaction graph 300, vertices of the graph F0-F5 represent fermionic modes. Edges between vertices represents interactions between fermionic modes, e.g., edge 302 represents an interaction between vertices F4 and F5. Fermions can hop between neighboring vertices. Qubits Q01, Q03, Q05, Q12, . . . Q45 are introduced on respective edges of the graph 300, e.g., Qubit Q45 is introduced on edge 302. The fermionic state of the fermionic system is then encoded in a subspace of the qubits.

Returning to FIG. 2, the system determines qubit operators that share the same algebra as the fermionic operators. That is, the system determines qubit operators that satisfy the quadratic Majorana operator commutation relations and dependence relation given in Equations (9a-c) and 10 (step 206). Determining the qubits operators includes, for each vertex in the interaction graph: selecting an order for all incident edges for the vertex, and using the selected orders to map the single-mode majorana operators to respective qubit operators. For example, the system can select an ordering of the incident edges for each vertex of G, e.g., (l, k)<(j, k) which means that the edge (l, k) is placed before (j, k) among all the incident edges of the vertex k. The quadratic Majorana operators in Equations (9a-c) can then be mapped to corresponding qubit operators by $$\eta k \mapsto \tilde{\eta} k = \prod_{j:(j,k)\in E} Z_{jk}, \quad (11)$$

$$\xi_{jk} \mapsto \tilde{\xi}_{jk} = \epsilon_{jk} X_{jk} \prod_{\substack{k:(l,k)<(j,k); \\ (l,k)\in E}} Z_{lk} \prod_{\substack{m:(m,j)<(k,j); \\ (m,j)\in E}} Z_{mj}, \quad (12)$$

where the anti-symmetric coefficients $\epsilon_{jk}=-\epsilon_{kj}=\pm 1$ can be selected arbitrarily for each edge (j, k). The qubit operators (also referred to as logical operators) $\tilde{\eta}_k$ and $\tilde{\xi}_{jk}$ satisfy the same commutation relations as those of the fermionic operators in Equations (9a-c). Unlike other fermion to qubit mappings that preserve geometric locality, the logical operators are allowed to be more general, e.g., non-uniform with respect to interaction graph vertices, and may involve Pauli-Y operators. For example, in the Bravyi-Kitaev superfast transformation the logical operators are translationally invariant by one lattice site. However, in the presently described MLSC this translational invariance is broken.

The mapping given by Equation (11) artificially introduces an extra conserved quantity $$\prod_{k=0}^{N_V-1} \tilde{\eta}_k = \mathbb{I} \quad (13)$$

which corresponds to the even-parity subspace of the original fermionic system. To simulate the odd-parity subspace, the sign in the mapping given by Equation (11) can be changed for a particular value of k, e.g., k=0, $$\tilde{\eta}_k \mapsto (-1)^{\delta_{k,0}} \prod_{j:(j,k)\in E} Z_{jk} \quad (14)$$

The system determines stabilizer operators corresponding to products of quadratic Majorana operators on respective loops in the interaction graph (step 208). The stabilizer operators are defined as being equal to products of the qubit edge operators on respective loops in the interaction graph. For example, a stabilizer operator corresponding to the conserved quantity given in Equation (10) above is given by $$S_{k_0 k_1 \ldots k_{l-1}} = (-i)^l \tilde{\xi}_{k_0 k_1} \tilde{\xi}_{k_1 k_2} \ldots \tilde{\xi}_{k_{l-1} k_0} \quad (15)$$

which remains unchanged under any cyclic permutation of the indices $k_0, k_1, \ldots, k_{l-1}$. These loop operators form an Abelian group, and the fermionic state is encoded in their common +1 eigenspace. These operators are referred to as stabilizer operators (or gauge operators, which are not to be confused with the non-commuting gauge operators in subsystem quantum error correcting codes.) As a consequence of the commutation relations given in Equations (9a-c), the stabilizer operators commute with all the logical operators $\tilde{\eta}_k$ and $\tilde{\xi}_{jk}$. They also commute with each other, and their common +1 eigenspace defines the code subspace $\mathcal{C}$ $$|\psi\rangle \in C, \text{ if and only if } S_{k_0 k_1 \ldots k_{l-1}} |\psi\rangle = |\psi\rangle \quad (16)$$

for all closed paths $(k_0, k_1, \ldots, k_{l-1}, k_0)$ in the graph G. Therefore, the restriction of the closed loop stabilizers to the code space act as the identity, as in the case of the Majorana operators. Application of the stabilizer operators to a qubit system corresponding to the fermionic system restricts the state of the qubit system to the code subspace C, which corresponds to restricting the state of the original fermionic system to the corresponding Fock space.

The above described description for determining qubit operators that satisfy the quadratic Majorana operator commutation relations and dependence relation given in Equations (9a-c) and 10 and determining stabilizer operators corresponding to products of quadratic Majorana operators on respective loops in the interaction graph (steps 206 and 208) can be further generalized to construct arbitrary MLSCs.

One method for generalizing the MLSC includes introducing a new set of qubit operators that belong to a same centralizer (the set of elements in the Pauli group that commute with all elements of the stabilizer group) of the stabilizer group, i.e., the stabilizer group generated by the stabilizer operators described above remains the same. This is achieved by application of a transformation on vector representations of the Majorana operators. The transformation retains the anti-commutation relations of the Majorana operators—similar to applying unitaries in the Clifford group to Pauli operators.

More specifically, the system represents each multi-mode Majorana operator (up to a sign) acting on n fermionic modes by a respective 2n-dimensional vector over GF(2) (the Galois field of two elements). For example, the Majorana operator $if_0 f_1 f_2$ acting on two fermionic modes can be represented (up to the overall phase factor i) by the vector (1 1 1 0), where 1 (0) indicates the presence (absence) of the corresponding single-mode Majorana operator in the product. The system then introduces a matrix M, whose rows correspond to the new Majorana operators in terms of the old ones. A specific example of M for n=2 takes the form $$M_4 = \begin{pmatrix} 1 & 1 & 1 & 0 \\ 0 & 1 & 1 & 1 \\ 1 & 0 & 1 & 1 \\ 1 & 1 & 0 & 1 \end{pmatrix} \quad (17)$$

where the new Majorana operators satisfy the standard anti-commutation relations in Equation (2). The matrix M can then be applied to vector representations of each Majorana operator to generate new Majorana operators. The new Majorana operators can be used in place of the original Majorana operators in the MLSC.

Since the overall parity is conserved by any quadratic Majorana operator, the Hamming weights of all the row vectors in M are all odd or all even. The four-Majorana transformation $M_4$ plays a similar role as the two-qubit gate in the Clifford group, whereas permutations of the Majorana modes are similar to single-qubit Clifford operations. A general transformation matrix M on 2n Majorana modes can be decomposed into a sequence of the four-Majorana transformation $M_4$ and row permutation matrices. Any two rows of M are orthogonal to each other due to the anti-commutation relations of Majorana operators given in Equation (2). To retain geometric locality, transformations can be restricted to those between neighboring Majorana modes.

Another method includes modifying the qubit operators and updating the stabilizer group based on the modified qubit operators. The system identifies a Pauli operator Δ that anti-commutes with at least one of the stabilizer operators, e.g., S. The system selects a qubit operator and updates the selected qubit operator via L ↦ LΔ. The system identifies a set of qubit operators {L'}, excluding L, that anti-commutes with the Pauli operator Δ. The system updates these qubit operators by multiplying them with the stabilizer operator, i.e., L' ↦ L'S. The system updates the stabilizer operators using the updated qubit operators and based on Equation (10), and repeats the procedure for the remaining qubit operators until each qubit operator is updated. This procedure produces a new MLSC with modified qubit operators and stabilizers. In order for the resulting MLSC code to be geometrically local, the choice of a can also be geometrically local. By combining both methods, an arbitrary MLSC can be constructed.

To simulate the fermionic system, the system evolves the qubit system under a qubit Hamiltonian, e.g., for a predetermined time t (step 210). The system generates the qubit Hamiltonian by mapping terms of the fermionic Hamiltonian that include quadratic Majorana operators to corresponding terms of a qubit Hamiltonian that include qubit operators using the qubit operators determined at step 206.

During the evolving, the system applies the defined stabilizer operators to the qubit system and performs multiple stabilizer measurements. The qubit Hamiltonian commutes with the stabilizer operators, therefore measured values of the stabilizer operators remain the same under perfect (error-free) qubit Hamiltonian evolution. However, error operators, e.g., all single qubit Pauli operators, anti-commute with at least one of the stabilizer operators. Therefore, single qubit errors can be detected by measuring the values of the stabilizer operators. In the presently described MLSC, measured values of stabilizer operators (also known as syndromes) are different for different single-qubit errors. As a result, all single qubit errors on the interaction graph can be corrected during the evolving.

To simulate lattice fermion problems directly (i.e., without mapping to a corresponding qubit system), the hopping term $c_j^\dagger c_k$+h·c and the occupation term $c_k^\dagger c_k$ given in Equations (8a-b) above need to be physically implemented. In an implementation of BKSF on a 2D lattice, both the vertical and horizontal hopping terms are mapped to qubit operators of weight 6. Using the presently described techniques, the hopping terms are mapped to qubit operators of weight no more than 4 (sometimes 3). The occupation terms can also be implemented with lower-weight qubit operators. Being able to implement logical operations with low-weight Pauli operators while correcting all single-qubit errors is an important feature for near-term quantum error-mitigating schemes. The weights of the stabilizers in the presently described techniques range from 4 to 10. Measurements are often a bottleneck in error-corrected quantum computations implemented on near-term devices. For example, it can take up to ~1 μs to readout the state of a superconducting qubit with fidelity~0.95, while the typical two-qubit gate time is ~40 ns with ith fidelity~0.995. Syndrome readouts should only be performed sparsely on these near-term devices, e.g., per syndrome readout cycle for at least tens of logical gate cycles. The total number of gates, therefore, is dominated by the logical operations and not the syndrome readout.

Table I below shows the differences between the presently described techniques and the BKSF on a 2D lattice in terms of the code distance, weights of the occupation terms, and weights of the hopping terms. The presently described techniques exhibit improved distance and weight (logical) properties. The weights of the stabilizers in the presently described code ("our code"), ranging from 4 to 10, are typically higher than BKSF.

TABLE I

| | distance | occupation | hopping | stabilizer |
| --- | --- | --- | --- | --- |
| BKSF | 2 | 4 | 6 | 6 |
| Our code | 3 | 3 | 4 (3) | 4-10 |

The system can use the evolved qubit system to determine properties of the fermionic system. For example, the system can perform measurement operations on the evolved qubit system to determine corresponding measurement results. The measurement results can then be used to infer properties about the fermionic system. Performing measurement operations on the evolved qubit system may include applying a decoding circuit that maps the stabilizers and fermionic state to different registers, and measuring the different registers separately. Alternatively, correlation functions (corresponding to the properties of interest) and the stabilizers may be measured using ancilla qubits. The choice of measurement scheme depends on the type of device used to perform the method described herein.

In some implementations the fermionic system may be a Hubbard model. The fermionic system may represent a material, e.g., a cuprate or a copper oxide superconductor. In these examples the method described herein can be used to determine properties of the material such as superconductivity, magnetism, strength of interaction-driven metal-insulator transitions, optical conductivity, behavior of spin correlations with doping, or the presence of phase separation.

Figure 4A:
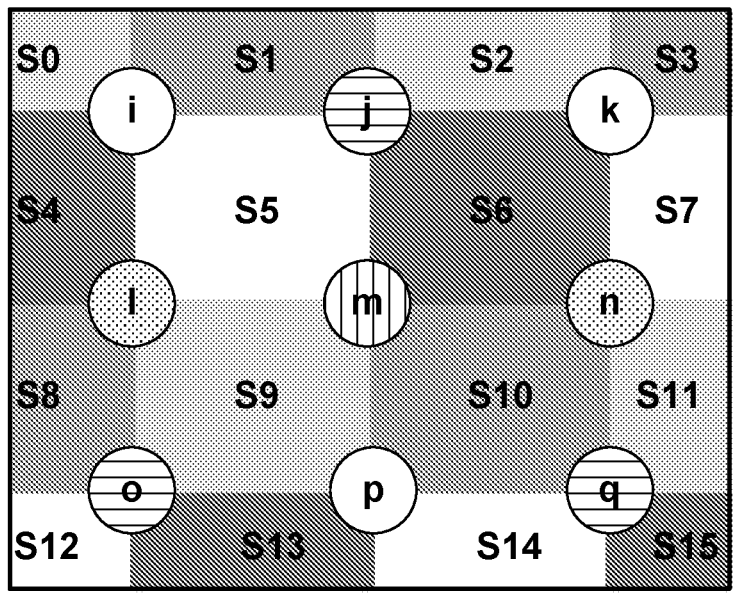
FIG. 4A shows an example structure of a MLSC code for a 2D square lattice.

FIG. 4A shows an example structure 400 of a MLSC code for a 2D square lattice. Each circle represents a vertex (fermionic mode) in the 2D lattice, where the shading of the vertices represent different types of vertices. One stabilizer operator S0-S15 is associated with each plaquette, where the shading of the plaquettes represent different types of corresponding stabilizer operators.

Figure 4B:
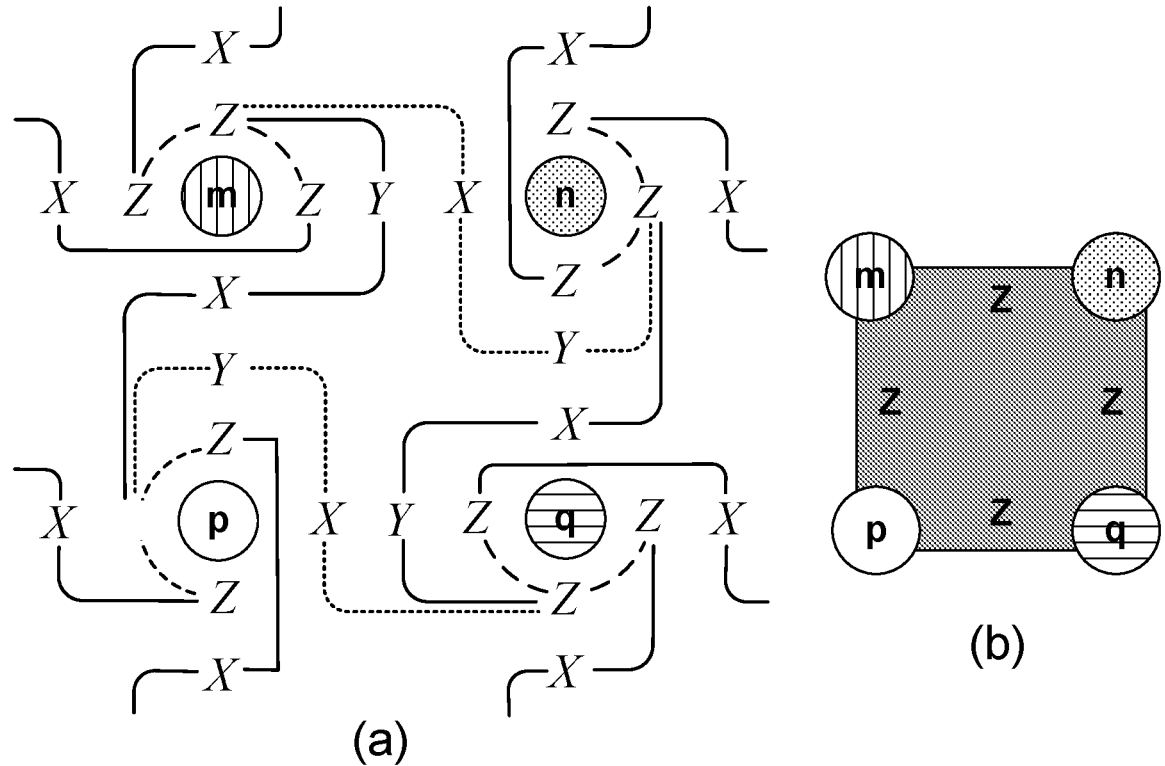
FIGS. 4B-E show logical operators and stabilizer operators for to the plaquettes shown in FIG. 4A.

FIG. 4B shows the logical operators and the stabilizer operators related to the bottom right plaquette of FIG. 4A, i.e., the plaquette consisting of the vertices m, n, q, p. One physical qubit is positioned on each edge of the lattice. The Pauli operators X, Y, and Z therein act on the qubits on the corresponding edges. Each quadratic Majorana operator in Equations (7a-b) is mapped to a product of single-qubit Pauli operators linked by a line. The vertex operator $\eta_m$ is mapped to a product of three Pauli-Z operators linked by a curved dashed line around the site m, and similar for the other vertex operators. The edge operator $\xi_{mn}$ is mapped to the Pauli operator $Z \otimes X \otimes Y \otimes Z$ on the upper dotted line, where the only Pauli-X operator acts on the edge (m, n). The same rule applies to the remaining edge operators (where the Pauli-X operator always acts on the corresponding edge of $\xi$. These operators satisfy the commutation relations from Equations (9a-c) (which can be verified numerically). This plaquette has a rotational symmetry of order 4. The stabilizer operator $$S_{mnpq} = \tilde{\xi}_{mn}\tilde{\xi}_{nq}\tilde{\xi}_{qp}\tilde{\xi}_{pm} \quad (18)$$

$$= -Z_{mn}Z_{np}Z_{pq}Z_{qm} \quad (19)$$

associated with the plaquette is plotted in part (b) of FIG. 4B, up to an overall minus sign, where the definition and convention of Equation (15) are used, $\epsilon_{jk}=1$ if the site k is to the right of, or below the site j.

For nomenclature purposes the terms $\xi_{mn}$, $\xi_{mn}\eta_m$, $\xi_{mn}\eta_n$, $\xi_{mn}\eta_m\eta_n$, are referred to as generalized edge operators. In some implementations the weight of any generalized edge operator in the plaquette of part (b) of FIG. 4B may be greater or equal to three, e.g., when all single-qubit errors are to be corrected. Other transformations, e.g., the BKSF, violate this condition on a 2D lattice no matter how the incident edges are ordered.

Figure 4C:
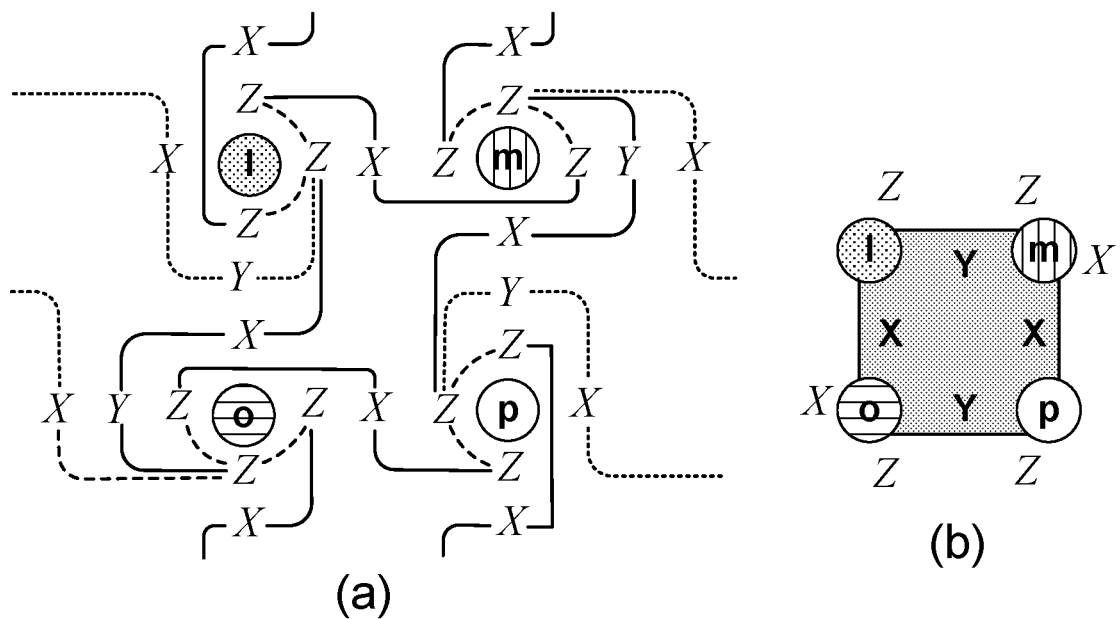
Figure 4D:
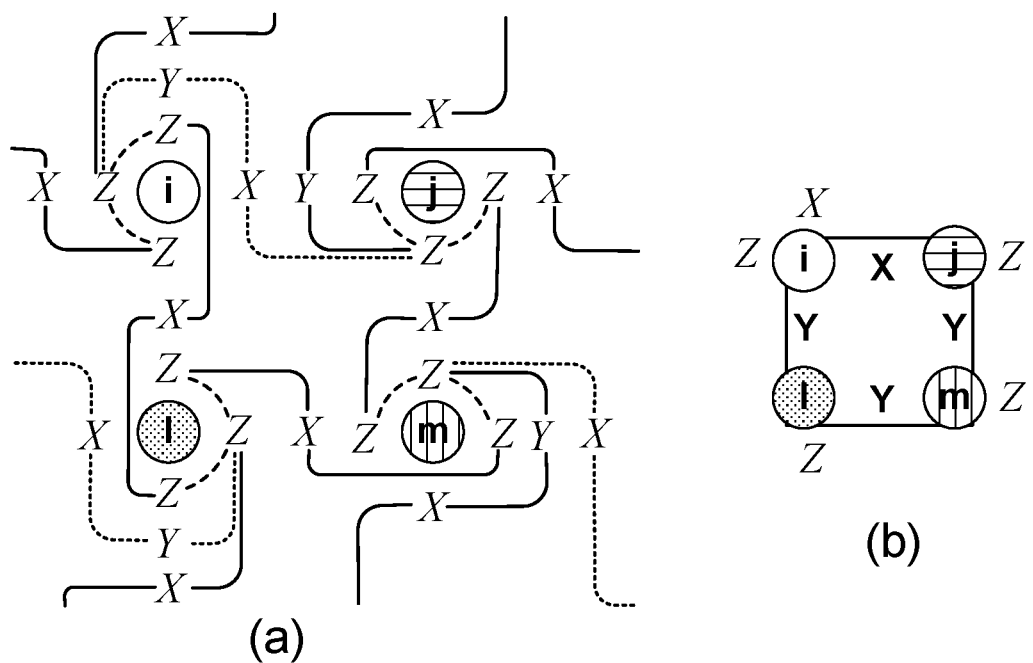
Figure 4E:
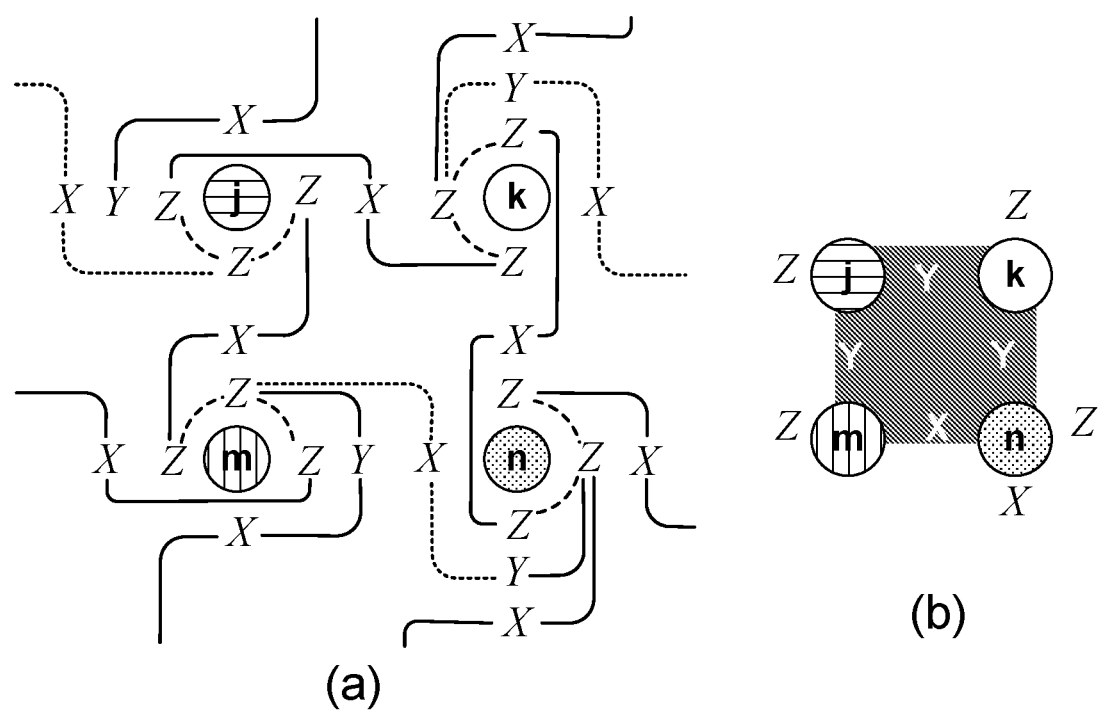

An entire code can be constructed by putting together the four types of vertices shown in FIG. 4B, where each Pauli X operator is shared by two neighboring vertices. Similarly to FIG. 4B, FIG. 4C shows the logical operators and the stabilizer operators related to the bottom left plaquette of FIG. 4A, i.e., the plaquette consisting of the vertices l, m, o, p. This plaquette has a rotational symmetry of order 2. FIG. 4D shows the logical operators and the stabilizer operators related to the top left plaquette of FIG. 4A, i.e., the plaquette consisting of the vertices i, j, l, m. FIG. 4E shows the logical operators and the stabilizer operators related to the top right plaquette of FIG. 4A, i.e., the plaquette consisting of the vertices j, k, m, n. These logical operators are identical to those in part (a) of FIG. 4D by a $\pi$ rotation. The corresponding stabilizer shown in part (b) is also identical to that in part (b) of FIG. 4D by a $\pi$ rotation.

In each of FIGS. 4C-E, any generalized operator in the respective plaquette can have weight greater or equal to three. In some implementations any generalized operator in the respective plaquette will have weight greater or equal to three. For example, up to an overall sign such a generalized operator M can be specified as $$M = \prod_{(j,k)\in E_M} \tilde{\xi}_{jk} \prod_{j\in V_M} \eta_l, \quad (20)$$

where $E_M$ and $V_M$ represent the sets of edges and vertices that determines M. Without loss of generality, it can be assumed that for any vertex $j\in V_M$ there must be an edge (j, k)$\in E_M$ for some vertex k. Otherwise, the weight of M can be reduced by removing j from $V_M$ (the only exception is that removing $\eta_k$ from $\eta_j\eta_k\eta_m$ in FIG. 4E increases its weight from 5 to 6). A vertex j can be referred to as a single paired vertex if exactly one of its incident edges is in $E_M$. At least one Pauli-Z operator on the other three incident edges of j contributes to M no matter whether $j\in V_M$ or not. If there are more than one single-paired vertex in $V_M$, the weight of M must be greater than, or equal to three. This is because there must be some Pauli-X or Y components in M to make it anti-commute with the vertex operators on the single-paired vertices, besides at least two Pauli-Z operators associated with the single paired vertices. When $V_M$ contains two edges, the only case with less-than-two single-paired vertices is two parallel edges sitting next to each other. FIGS. 4B-E show that the weights of such logical operators are always greater than, or equal to three. The specific choice of the vertex layout in FIG. 4A is important to preventing the opposite from happening.

The syndrome of a single-qubit error can be described by the stabilizer operators which anti-commute with it. As an example, the syndromes of the single-qubit errors on all incident edges of the vertex m in FIG. 4A are:

$$X_{mp}:S_{10},S_{13}, Z_{mp}:S_9,S_{14}, \quad (21)$$

$$X_{lm}:S_4,S_5,S_6,S_9, Z_{lm}:S_5,S_9, \quad (22)$$

$$X_{mn}:S_5,S_{10}, Z_{mn}:S_6,S_9, \quad (23)$$

$$X_{jm}:S_2,S_5,S_6,S_9, Z_{jm}:S_5,S_6. \quad (24)$$

These single-qubit errors (Pauli-Y errors not listed) have different syndromes. With periodic boundary conditions all of the single qubit errors have different syndromes on an 8 by 8 lattice (128 qubits).

Operating the Hardware: Example Implementation of MLSC for Open Boundary Conditions As shown above with reference to FIGS. 2-4E, MLSCs can be defined on lattices with periodic boundary conditions. However, in realistic experimental setups, periodic boundary conditions are usually unavailable or very costly to implement. Boundary effects are significant for lattices of modest sizes, e.g. those available to near-term quantum computing devices. For instance, most of the vertices are located at the boundaries in a 4 by 4 square lattice. Errors on the boundary qubits are more difficult to correct, because they are involved in a smaller number of stabilizers, i.e., fewer syndromes can be used to correct/detect the errors. This problem is especially prominent for qubits around the corners of a lattice, where two boundary edges meet. For this reason, using the MLSC described above with open boundary conditions can result in uncorrectable single-qubit errors.

To overcome this problem, dangling boundary edges added during example process 200. A dangling edge is a horizontal or vertical edge on a square lattice that extends from a boundary vertex in the interaction graph and does not connect the boundary vertex to another vertex. For convenience, the below description of adding dangling boundary edges is described with reference to a 4 by 4 square lattice. However, open boundary MLSCs of larger sizes can be constructed using the same procedure.

Figure 5:
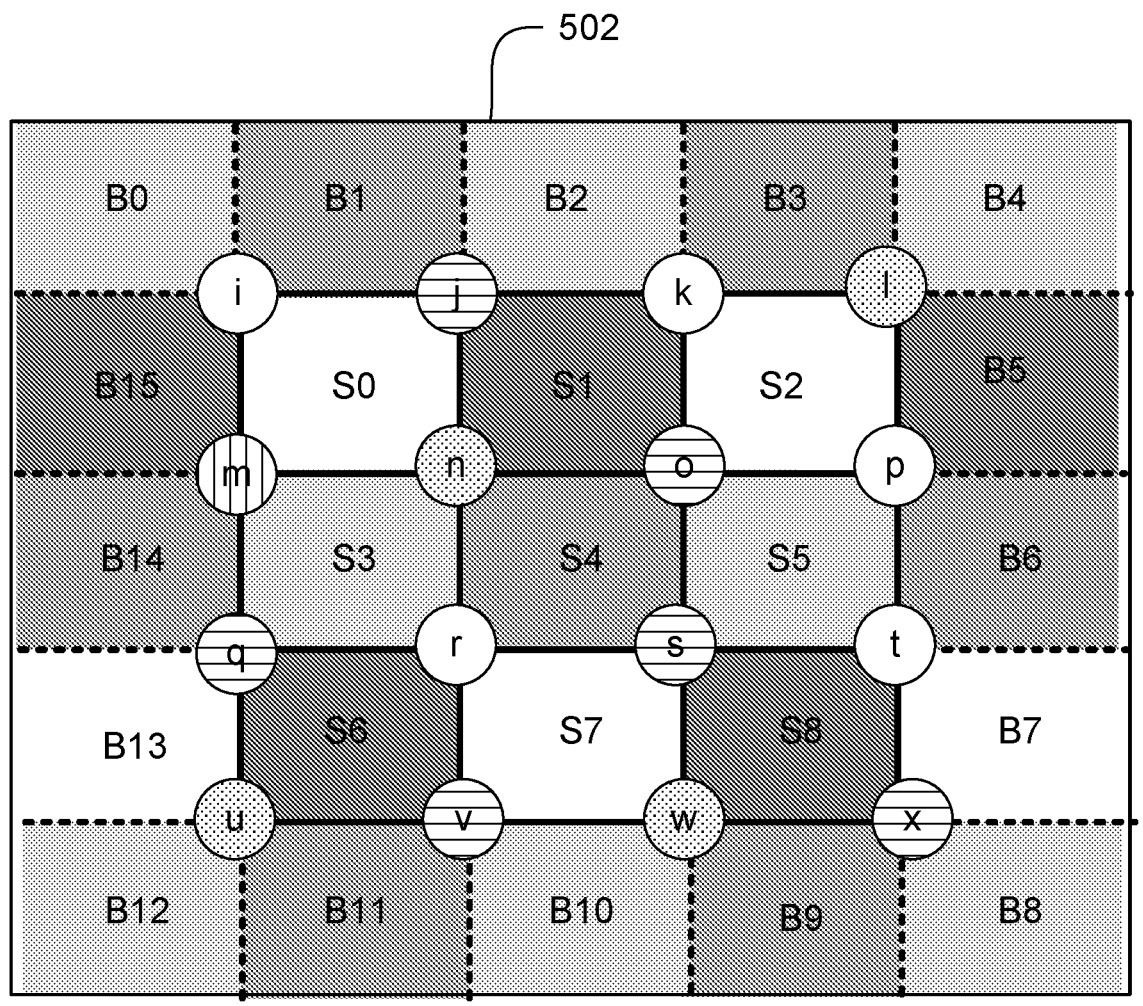
FIG. 5 shows an example MLSC on a 4 by 4 lattice with open boundary conditions.

FIG. 5 shows an example MLSC on a 4 by 4 lattice with open boundary conditions. Each vertex represents one fermionic mode (16 in total) and each edge (solid black) in the bulk of the code is associated with a logical edge operator (24 in total). Each added dangling edge (dashed) introduces an additional physical qubit at the boundaries (16 in total). The logical operators—including all the vertex operators and edge operators—are defined using the same rules as the MLSC described above with reference to FIGS. 2-4. This is possible because any vertex (edge) operator of a MLSC only involves the Pauli operators on the edges incident on that vertex (edge), i.e, logical operators in the bulk of the code has no support beyond the dangling edges. Therefore, the commutation relations given in Equations (9a-c) are satisfied, and the stabilizers in the bulk of the code $S_0, S_1, \ldots, S_8$ remain the same as those in the periodic boundary case. Introducing the dangling edges adds extra degrees of freedom, which allow for the construction of additional stabilizers $B_0, B_1, \ldots, B_{15}$ to correct errors at the boundaries. Since the number of boundary stabilizers is equal to the number of dangling edges, the extra degrees of freedom are eliminated. Because each qubit at (or close to) the boundary is involved in more stabilizers, errors on them are more likely to be correctable.

To define the boundary stabilizers, edge operators $D_0, D_1, \ldots, D_{15}$ associated with the dangling edges are defined, where $D_0$ corresponds to the vertical dangling edge of the vertex i (labelled 502) and the remaining edge operators $D_1, \ldots, D_{15}$ follow clockwise along the boundaries. These operators are defined using a similar rule as the edge operators in the bulk of the code described with reference to FIGS. 2-4, but Pauli operators on edges beyond the dangling edges are neglected. Each dangling edge operator is defined to anti-commute with the vertex and edge operators incident on it. As a consequence, the dangling edge operators commute with all the stabilizer operators in the bulk of the code $S_0, S_1, \ldots, S_8$.

Operators $A_0, A_1, \ldots, A_{15}$ are then defined as the products of all the edge operators in a boundary plaquette. For example, $A_0$ is the product of the two dangling edge operators incident on vertex i ($D_0$ and $D_{15}$), while $A_1$ is the product of the edge operators on (i; j) and the two vertical dangling edge operators incident on vertices i and j ($D_0$ and $D_1$). These operators commute with all the logical operators, because each logical operator anti-commutes with either zero or two edge operators in $A_\alpha$. However, neighboring operators $A_\alpha$ and $A_{\alpha\pm1}$ (mod 16) anti-commute with each other. For example, $D_0$ anti-commutes with $A_1$, while $D_{15}$ commutes with $A_1$. Therefore, $A_0 = D_0 D_{15}$ anti-commutes with $A_1$.

To construct boundary stabilizers that commute with each other, the conjugate operator for each dangling edge is introduced. These are denoted as $C_0, C_1, \ldots, C_{15}$, starting with the vertical dangling edge of the vertex i and counting clockwise along the boundary. The conjugate operator $C_\alpha$ anti-commutes with $D_\alpha$, but commutes with all the logical operators and $D_\beta$ for $\beta \neq \alpha$. The conjugate operators also commute with each other $[C_\alpha, C_\beta]=0$ for all $\alpha, \beta=0, \ldots, 15$. When all of the edge operators incident on a dangling edge only have the Pauli-Z component on it, the conjugate operator is the single qubit Pauli-Z operator on the corresponding dangling edge. For example, $C_{15}$ is equal to the Pauli-Z operator on the horizontal dangling edge incident on vertex i. The situation is more complicated when some edge operator has a Pauli-Y component on the dangling edge. For example, $C_0$ is the product of the Pauli-Z operators on the edge (i; j) and the two vertical dangling edges incident on i and j. In general, these operators are defined as the product of Pauli-Z operators on the dangling edge, a second edge whose edge operator has a Pauli-Y component on the dangling edge, and a neighboring dangling edge (if it exists) whose edge operator has a Pauli-Y component on the second edge.

The boundary stabilizers can then be defined as $$B_\alpha = iA_\alpha C_\alpha \text{ for } \alpha=0, 1, \ldots, 15 \tag{25}$$

The boundary stabilizers commute with all the logical operators and the stabilizers in the bulk. They also commute with each other, i.e., $[B_\alpha, B_{\alpha+1}]=0$. Any Pauli operator with weight one or two anti-commutes with at least one of the stabilizers, therefore, the code distance is three and all single-qubit errors are correctable.

Operating the Hardware: Extension of the MLSC for General Fermion Models

The presently described MLSC can be applied to models other than the lattice models described above. For example, the MLSC can be applied to the task of quantum simulation of interacting Fermion models with a high degree of connectivity, e.g., the molecular electronic structure Hamiltonian given by $$H = \sum_{pq} h_{p,q} a_p^\dagger a_q + \frac{1}{2} \sum_{pqrs} h_{pqrs} a_p^\dagger a_q^\dagger a_r a_s$$

where $a_p$ and $a_p^\backslash$ represent annihilation and creation operators for spin orbital p and $h_{pq}$, $h_{pqrs}$ represent scalar coefficients that may be given by known integrals over the basis functions dependent on the particular discretization scheme. This Hamiltonian has $O(N^2)$ terms in the one-body operator where N is the number of orbitals (basis functions) into which the system is discretized. Therefore, directly applying the MLSC to this Hamiltonian would require $O(N^2)$ qubits, which is an unacceptable overhead in most contexts.

However, rather than directly encoding the Hamiltonian for the system to be simulated, the algorithm used to perform the simulation can be encoded. That is, if a simulation of the Hamiltonian (or more generally any algorithm) using only a gate set defined in terms of evolution under fermionic operators on a lattice, the algorithm can be encoded into the MLSC representation with only a constant factor increase in the number of qubits, thereby making the error correction properties of these encodings practical to utilize in a much more general context.

As an example, a tensor factorization of the Coulomb operator can be performed to express the electronic structure Hamiltonian as $$R_0\left(\sum_p f_p n_p\right)R_0^\dagger + \sum_{\ell=1}^L R_\ell\left(\sum_{pq} g_{pq}^{(\ell)} n_p n_q\right).$$

where $f_p$ and $g_{pq}$ are scalars, $L=O(N)$ for chemistry applications, and $R_1$ represents a unitary rotation of the single particle orbital basis. A Trotter step of time evolution can then be implemented using known techniques, e.g., algorithms that enable the exact realization of $R_\ell$ and time evolution under $\Sigma_{pq} g_{pq} n_p n_q$ each using $O(N^2)$ applications of nearest neighbor gates from a set generated only by nearest neighbor fermion terms $n_p$, $n_{p+1}$, $n_p n_{p+1}$, $a_p^\dagger a_{p+1} + a_{p+1}^\dagger a_p$. All of these fermion terms are represented within the MLSC applied to a planar lattice. Therefore, the entire Trotter step requires only $O(LN^2)$ gates within the MLSC (which translates to $O(N^3)$ gates in the case of chemistry, matching the lowest known gate complexity of a Trotter step of this Hamiltonian and requires only 2N qubits. The MLSC encoding on a 2D lattice could then be used and then a 1D path could be snaked through this lattice over which these nearest-neighbor algorithms are implemented in the code.

By encoding a lattice fermion Hamiltonian whose individual terms generate all of the gates in these algorithms the error correction properties of the MLSC can be leveraged in a more general context than lattice models.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

Elements of a digital and/or quantum computer can include a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for error corrected quantum simulation of a fermionic system, wherein the fermionic system is characterized by a fermionic Hamiltonian comprising elements from a group of quadratic Majorana operators of even weights, wherein the quadratic Majorana operators satisfy a set of commutation relations and a dependence relation that implies that the quadratic Majorana operators are not independent, the method comprising:

representing the fermionic system as an interaction graph of vertices and edges, wherein each vertex represents a fermionic system fermionic mode and each edge represents an interaction between two respective fermionic modes;

allocating a qubit to each edge in the interaction graph to form a qubit system;

determining qubit operators that satisfy the set of commutation relations and the dependence relation, wherein the qubit operators are non-uniform with respect to the interaction graph vertices;

determining stabilizer operators corresponding to products of quadratic Majorana operators on respective loops in the interaction graph, wherein a common eigenspace of the defined stabilizer operators defines a code subspace that encodes states of the fermionic system;

simulating the fermionic system by evolving the qubit system under a qubit Hamiltonian, wherein the qubit Hamiltonian comprises the determined qubit operators and evolving the qubit system under the qubit Hamiltonian comprises applying the determined stabilizer operators to the qubit system and performing multiple stabilizer measurement to detect single qubit errors; and providing, as output, data representing results of the simulating to determine properties of the fermionic system.

2. The method of claim 1, wherein the qubit operators comprise Pauli-Y operators.

3. The method of claim 2, wherein evolving the qubit system under the qubit Hamiltonian comprises correcting all single qubit errors.

4. The method of claim 1, wherein the determined qubit operators have weight greater or equal to three.

5. The method of claim 4, wherein the determined qubit operators have weight less than or equal to four.

6. The method of claim 1, wherein the fermionic system comprises a two-dimensional square lattice of fermions.

7. The method of claim 6, wherein the lattice comprises periodic boundary conditions.

8. The method of claim 6, wherein the lattice comprises open boundary conditions.

9. The method of claim 6, wherein the qubit operators comprise edge and vertex operators, and wherein the method further comprises:
adding a first number of dangling edges to the interaction graph, wherein the first number is equal to the number of boundary vertices in the interaction graph plus four;
determining a respective boundary stabilizer operator for each dangling edge, comprising, for each dangling edge:
determining a respective dangling edge operator, wherein the dangling edge operator anti-commutes with incident vertex and edge operators and commutes with the determined stabilizer operators;
determining a product of edge operators in a respective boundary plaquette, wherein the product of edge operators in the respective boundary plaquette commute with the determined qubit operators and anti-commute with each neighboring product of edge operators in a neighboring boundary plaquette;
determining a conjugate operator, wherein the conjugate operator anti-commutes with the dangling edge operator for the dangling edge, commutes with the determined qubit operators, commutes with dangling edge operators for other dangling edges, and commutes with other conjugate operators;
defining the boundary stabilizer operator for the dangling edge as equal to i multiplied by the product of edge operators in the respective boundary plaquette multiplied by the conjugate operator for the dangling edge.

10. The method of claim 9, wherein the determined boundary stabilizer operators commute with the determined qubit operators, determined stabilizer operators, and with each other.

11. The method of claim 7, wherein the method further comprises allocating a qubit to each dangling edge.

12. The method of claim 1, wherein the method further comprises applying a transformation to the quadratic Majorana operators to generate transformed quadratic Majorana operators, comprising:
representing each quadratic Majorana operator as a 2m dimensional vector over the Galois field of two elements;
constructing a matrix whose rows correspond to the transformed quadratic Majorana operators; and
generating a set of transformed quadratic Majorana operators by applying the constructed matrix to each of the quadratic Majorana operators.

13. The method of claim 10, wherein the transformed quadratic Majorana operators satisfy the set of commutation relations.

14. The method of claim 1, wherein the method further comprises modifying the determined qubit operators and updating the determined stabilizer operators based on the modified determined qubit operators, comprising repeatedly, until each qubit operator and stabilizer operator have been updated:
identifying a Pauli operator that anti-commutes with at least one determined stabilizer operator;
selecting a determined qubit operator and updating the selected qubit operator by multiplying the selected determined qubit operator by the identified Pauli operator;
identifying a set of determined qubit operators, wherein the set of determined qubit operators excludes the determined qubit operator and anti-commutes with the identified Pauli operator;
updating determined qubit operators in the identified set of determined qubit operators by multiplying each qubit operator by one of the at least one determined stabilizer operator; and
updating the at least one determined stabilizer operators using the updated qubit operators.

15. The method of claim 1, wherein during the evolving of the qubit system the defined stabilizer operators restrict the state of the qubit system to the code subspace.

16. The method of claim 1, wherein the determined qubit operators comprise qubit operators corresponding to respective edges in the interaction graph, and wherein defining stabilizer operators corresponding to products of quadratic Majorana operators on respective loops in the interaction graph comprises defining stabilizer operators equal to products of the qubit edge operators on respective loops in the interaction graph.

17. The method of claim 1, wherein the defined stabilizer operators commute with each of the determined qubit operators and with each other.

18. The method claim 1, wherein the qubit system preserves locality of the fermionic system.

19. The method of claim 1, wherein determining the qubit operators comprises:
for each vertex in the interaction graph, selecting an order for all incident edges for the vertex; and
using the selected orders to map the quadratic majorana operators to respective qubit operators.

20. The method of claim 1, wherein evolving the qubit system comprises:
evolving the qubit system for a predetermined time under the qubit Hamiltonian to generate an evolved qubit system; and experimentally probing the evolved qubit system to determine properties of the fermionic system.

21. The method of claim 1, wherein the fermionic system is represented by the Hubbard model, and wherein evolving the qubit system using a quantum computing device to simulate the fermionic system comprises evolving the qubit system using a quantum computing device to simulate properties of the fermionic system.

22. The method of claim 18, wherein the fermionic system represents a material, and wherein properties of the fermionic system comprises superconductivity, magnetism, strength of interaction-driven metal-insulator transitions, optical conductivity, or behavior of spin correlations with doping.

23. The method of claim 20, wherein the material comprises a cuprate material.

24. The method of claim 18, wherein the fermionic system comprises a copper oxide superconductor, and wherein properties of the fermionic system comprises the presence of phase separation.

25. An apparatus comprising:
one or more classical processors; and
quantum hardware;
wherein the apparatus is configured to perform an error corrected quantum simulation of a fermionic system, wherein the fermionic system is characterized by a fermionic Hamiltonian comprising elements from a group of quadratic Majorana operators of even weights, wherein the quadratic Majorana operators satisfy a set of commutation relations and a dependence relation that implies that the quadratic Majorana operators are not independent, the quantum simulation comprising:
representing the fermionic system as an interaction graph of vertices and edges, wherein each vertex represents a fermionic system fermionic mode and each edge represents an interaction between two respective fermionic modes;
allocating a qubit to each edge in the interaction graph to form a qubit system;
determining qubit operators that satisfy the set of commutation relations and the dependence relation, wherein the qubit operators are non-uniform with respect to the interaction graph vertices;
determining stabilizer operators corresponding to products of quadratic Majorana operators on respective loops in the interaction graph, wherein a common eigenspace of the defined stabilizer operators defines a code subspace that encodes states of the fermionic system;
simulating the fermionic system by evolving the qubit system under a qubit Hamiltonian, wherein the qubit Hamiltonian comprises the determined qubit operators and evolving the qubit system under the qubit Hamiltonian comprises applying the determined stabilizer operators to the qubit system and performing multiple stabilizer measurement to detect single qubit errors; and
providing, as output, data representing results of the simulating to determine properties of the fermionic system.

* * * * *